June 22, 1943.    I. E. MUSKAT ET AL    2,322,310

TRANSPARENT BARRIER FOR VEHICLES

Filed Feb. 8, 1940

Infusible Allyl (2) Methacrylate Polymer

Methyl Methacrylate Polymer (1)

Completely Cured Hard Infusible Polymer

Polymer In Softer Stage Of Polymerization

INVENTOR.
IRVING E. MUSKAT
MAXWELL A. POLLACK
FRANKLIN STRAIN
WILLIAM A. FRANTA
BY Raymond S. Christopher
ATTORNEY.

Patented June 22, 1943

2,322,310

UNITED STATES PATENT OFFICE 2,322,310

TRANSPARENT BARRIER FOR VEHICLES

Irving E. Muskat, Maxwell A. Pollack and Franklin Strain, Akron, and William A. Franta, Barberton, Ohio, assignors to Pittsburgh Plate Glass Company, Allegheny County, Pa., a corporation of Pennsylvania Application February 8, 1940, Serial No. 317,872

5 Claims. (Cl. 117—139)

This invention relates to a novel barrier which is suitable for use as windshields or windows in automobiles, airplanes, boats, etc. Prior to the present invention, various glass structures have been used for this purpose and in order to avoid the dangers arising from shattered or splintered glass, these structures generally consisted of one or more glass sheets cemented to a sheet of a soft adhesive resinous material. While such structures do not shatter upon impact of a relatively heavy blow, they crack easily and in many cases fragments splinter off the glass surface.

Various attempts have been made to replace such structures with products made from resinous materials. However, it has been observed that these materials are too soft to resist the wearing and abrasive action to which such barriers are subjected. Thus, the exterior surface of such barrier sheets become scratched after brief use to such an extent that visibility through the barrier is seriously hampered. This problem is particularly acute since the light reflection and glare created by the scratches is so great as to make night driving exceedingly hazardous.

In accordance with the present invention, we have provided a barrier, composed entirely of transparent resinous materials, which are highly resistant to shattering and splintering and which possess surfaces which are sufficiently hard to resist abrasion during use. We have been able to provide a composite resinous barrier, suitable for use in windows, windshields, etc. in vehicles, which possesses high transparency and stability to light, which is resistant to the action of organic solvents and which also possesses the properties of great flexibility and resistance to scratching and to shattering. More particularly, we have discovered that products of high flexibility, wear and scratch resistance may be secured by providing a relatively soft resinous base with a relatively harder surface or coating on one or all sides thereof. Where the coating is provided on only one side, the barrier is preferably mounted so that the coating is on the exterior surface of the barrier since this surface is subjected to great wear and abrasion. Such surfaces may be secured by providing the base with a film, coating, or layer of the harder resin which is generally of the thermosetting type such as may be derived from the polymerization of an organic compound containing two or more polymerizable groups.

Applicants have been able to increase the abrasion and solvent resistance of relatively soft resins to a surprising degree. In accordance with this invention it is preferred to use as the base material a flexible resinous product which is transparent, resistant to shattering, and possesses some degree of elasticity. Various plastics such as the polymers of saturated esters or amides of acrylic or α-substituted acrylic acids, such as polymerized methyl methacrylate, ethyl methacrylate, methyl methacrylamide, methyl or ethyl acrylate, methyl or ethyl chloroacrylate, or the higher esters of these acids, such as the propyl, butyl, isobutyl, phenyl or stearyl esters thereof or the corresponding monoesters of polyhydric alcohols, such as ethylene glycol monomethacrylate, glycerol monomethacrylate, or mixtures of these polymers have been found suitable for base materials. Other thermoplastic polymers which are sufficiently flexible, transparent and stable to light or heat to permit their use in lieu of glass also may be coated or surfaced in accordance with our invention to provide them with hard, durable, solvent-resistant, and transparent surfaces. For example, various other vinyl polymers, such as polyvinyl acetate, polyvinyl chloride, polyvinyl butyrate, polystyrene, polyvinyl butyral, polyvinyl benzoate, or other fusible or other thermoplastic polyvinyl halide or ester of saturated aliphatic or araliphatic acid may be used as base materials. In similar manner, the corresponding allyl or methallyl polymers or other polymers of unsaturated alcohols or esters or ethers thereof such as polyallyl acetate, polyallyl benzoate, polyallyl butyrate, etc. may be used.

Copolymers which may be suitable for use as the base plastic in accordance with the present invention have been described in United States Patents granted to Benjamin Garvey, Nos. 2,155,590, and 2,155,591, and also to United States Patent Nos. 2,160,931, 2,160,932, 2,160,940, 2,160,941, 2,160,942, and 2,160,943.

Most efficient results have been secured by use of a coating of a polymer of the unsaturated esters of acrylic and α-substituted acrylic acids or the polyhydric alcohol polyesters of these acids or the corresponding amides thereof such as allyl acrylate, allyl methacrylate, allyl chloracrylate, methallyl acrylate, methallyl methacrylate, methallyl chloracrylate, ethyl methacrylate, crotyl methacrylate, 2-chloroallyl acrylate, 2-chloroallyl methacrylate, oleyl methacrylate, vinyl acrylate, vinyl methacrylate, propargyl acrylate, propargyl methacrylate, resorcinol dimethacrylate, glycol dimethacrylate, glycol diacrylate, glycerol di- or trimethacrylate or mixtures thereof, or polyglycol diacrylates, glycerol di- or triacrylate or the acrylic, methacrylic, or alpha-chloracrylic esters of the higher polyhydric alcohols, such as sorbitol or mannitol wherein at least two of the hydroxyl groups are esterified with the above named acids. Additionally, hard, solvent resistant coatings may be secured through use of the corresponding amides of the polymerizable unsaturated acids, such as vinyl, allyl, methallyl, ethyl allyl, propargyl or oleyl acrylamides, methacrylamides or chloracrylamides. In addition, other materials containing polymerizable groups

or other polymerizable groups of this type, such as vinyl allyl ether, diallyl crotonamide, diallyl methacrylamide, diallyl acrylamide, monoallyl methacrylamide, or substituted urea derivatives, such as diallyl urea, crotonic, acrylic, methacrylic, chloracrylic, or similar ester of polyalkylol amines such as triethanol amine, triacrylate, etc. may also be used.

Other products may be secured by polymerization of other organic compounds which contain at least two polymerizable groups preferably those in which one of the groups is the polymerizable groups

and is separated by at least one atom from the other group whereby the groups are unconjugated. For example, unsaturated aliphatic esters of unsaturated aliphatic acids, such as the unsaturated crotonate esters, allyl crotonate, methallyl crotonate, crotyl crotonate, oleyl crotonate, 2-chlorallyl crotonate, ethyl allyl crotonate, propargyl crotonate, or other unsaturated esters, such as allyl oleate, allyl itaconate, allyl propiolate, diallyl maleate, allyl ethyl maleate, dimethallyl maleate, ethyl methallyl maleate, methyl allyl maleate, vinyl allyl maleate, divinyl maleate, dipropargyl maleate or other mono or polyester formed by esterification of maleic or fumaric acid or their substituted derivatives with an unsaturated alcohol or allyl citraconate, fumarate, methallyl fumarate, oleyl fumarate, allyl cinnamate, or the corresponding methallyl, ethyl allyl, or crotyl esters thereof, or the unsaturated polyesters of saturated polybasic acids and unsaturated monohydric alcohols such as diallyl oxalate, diallyl malonate, di- or triallyl citrate, diallyl tartrate, diallyl phthalate, diallyl carbonate, etc., or the corresponding methallyl or crotyl esters thereof may be used for this purpose. Similarly, the polyesters of polyhydric alcohols and monobasic unsaturated esters such as ethylene glycol dicinnamate, glycerol dicinnamate, glycerol dipropiolate, glycol dipropiolate, or the corresponding esters of other glycols such as the propylene glycols, butylene glycols or polyglycols thereof or the higher alcohols such as sorbitol or mannitol, etc. may be polymerized in this manner. Other organic oxygen compounds which contain at least two polymerizable double bonds and are capable of polymerizing to a final form which is transparent, hard and substantially infusible and insoluble may be used. Thus, unsaturated polyethers of polyhydric alcohols, such as the diallyl, -methallyl, -oleyl, or -crotyl ethers of glycols, such as ethylene, propylene or butylene glycol or polyglycols such as diethylene, glycol, tetraethylene glycol, etc., or the di- or triallyl, methallyl, oleyl, or crotyl ethers of glycerol or the corresponding polyethers of the higher polyhydric alcohols such as mannitol or sorbitol may be applied and polymerized in accordance with our invention. In addition, esters of inorganic acids such as diallyl sulphate, di- or triallyl phosphate, di- or triallyl borate, di- or triallyl phosphite, allyl silicates, allyl titanates, propargyl, crotyl, methallyl, or similar esters of unsaturated acids and polyvalent metals such as calcium, barium, magnesium, strontium, aluminum, titanium, chromium, iron, stannous, stannic, arsenious, or antimony, polymethacrylate, polyacrylate, polycrotonate, or the corresponding anhydrides of acrylic, chloracrylic, methacrylic, crotonic or other acids may be polymerized to form hard products in accordance with this invention. Thus, desirable products are secured by providing a relatively soft, flexible, preferably transparent plastic base with a relatively hard surface of an insoluble and/or infusible polymer.

The accompanying drawing diagrammatically illustrates suitable embodiments of the invention in which Fig. 1 is a cross-sectional view of a safety barrier embodying the present invention.

Figure 3:
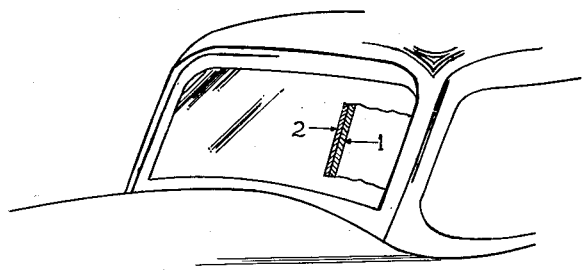
Fig. 3 is a perspective view partially in section of the material mounted in a vehicle.
Figure 1:
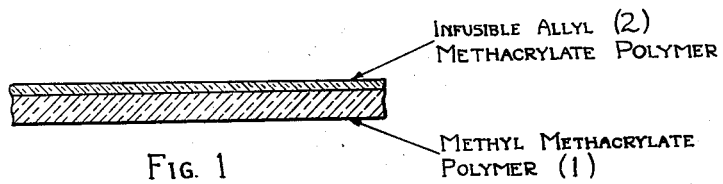

Referring to the drawing in Fig. 1, barrier sheet comprises a base plastic 1, which is provided on one side with a surface film of a suitable infusible polymer such as polymerized allyl methacrylate.

In order that a product of maximum surface hardness be produced, it is preferable to make use of compounds wherein the number of carbon atoms in the molecule of the monomeric form is not excessive. Thus, a methacrylate polymer which is surfaced with polymeric allyl or methallyl methacrylate or choracrylate exhibits a greater resistance to wear and is harder than a similar polymer which is surfaced with polymeric oleyl methacrylate. The trend toward softer products as the number of carbon atoms increase may be minimized by increasing the number of polymerization double bonds in the composition. Thus, sorbitol hexamethacrylate polymerizes to form a product which exhibits greater hardness than does polymeric oleyl methacrylate. In general, it is preferred to make use of agents wherein the ratio of the number of carbon atoms to the number of polymerizable olefinic groups does not exceed 15 and preferably materials wherein this ratio does not exceed 8 are made use of. In addition, it is found that most desirable products are secured through use of materials containing not in excess of 10 carbon atoms, in each of the alcohol residues and the acid residues. In contrast, the softer polymers may be used as base materials.

The plastic base may be surfaced in any convenient manner which permits the production of a hard surface which is free from visible surface defects. Production of such a film by application of the monomer often is found to be exceedingly difficult. This is particularly true of actively polymerizable materials such as glycol dimethacrylate, glycerol trimethacrylate, allyl methacrylate, allyl acrylate, etc., since when such agents are applied to a base in monomeric or syrupy solution and polymerized, cracked or irregularly surfaced products generally are obtained. It has been found that these difficulties may be largely eliminated however, by dissolving a quantity generally in excess of 10 percent of a fusible heat convertible polymer such as a fusible heat-convertible polymer of glycol or glycerol polymethacrylate, allyl methacrylate, or other fusible heat convertible polymer as hereinafter discussed in the monomer of glycol or similar methacrylate or similar polymerizable material and applying the mixture to the base.

The application of the coating may be most effectively controlled by applying the surfacing agent in its intermediate fusible, polymeric stage to the thermoplastic base and completing the polymerization. It has been discovered that polymerizable compounds, such as those which are contemplated herein and which ordinarily polymerize to form infusible, insoluble products, may, under proper conditions, be polymerized to form a soluble, thermoplastic polymer which may be polymerized further to the infusible state.

A fusible polymer of this type may be prepared, for example, by conducting the polymerization in a solution which is capable of dissolving the polymer in the presence of suitable catalysts, such as benzoyl peroxide, lauryl peroxide, oxygen, etc., and interrupting polymerization at the proper time. Thus, when a polymerizable compound containing two or more polymerizable groups, such as allyl chloracrylate, allyl methacrylate, etc., is dissolved in a solvent such as acetone, dioxane, chloroform, etc., a soluble polymer is initially formed, but as polymerization proceeds, the insoluble polymer is produced and the solution is converted into a non-reversible gel. By interrupting polymerization before the gel is formed, a soluble, fusible polymer may be secured. This polymer is found to be soluble in a majority of the solvents in which the polymer of the saturated acrylate or vinyl esters are normally soluble. Acetone, chloroform, toluene, dioxane, triacetin, ethylene glycol monophenol ether, ethylene glycol monoethyl ether, acetate, benzene, etc., are suitable solvents in general. The fusible polymers may be recovered by evaporation or distillation of the solvent by addition of a non-solvent, such as methyl or ethyl alcohol or water.

In accordance with one effective method of interrupting polymerization, inhibitors, such as pyrogallol, hydroquinone, aniline, phenylene diamine, sulphur, thiophenol, organic, or inorganic salts or complexes of the reduced form of metals, such as copper, manganese, cobalt, nickel, etc., dipentene, etc., may be added to the polymer during polymerization or before polymerization has been initiated. These solutions may be treated to remove the solvent by slow evaporation, treatment with a nonsolvent, or by other suitable method and fusible thermoplastic polymers which may be molded, machined, cut, bent or otherwise worked into desirable forms thereby attained. During shaping or after final shaping, the products may be completely hardened and rendered infusible by suitable methods hereinafter more fully set forth.

In the polymerization of allyl and methallyl esters of acrylic and alpha-substituted acrylic acid, such as allyl methacrylate, it has been found that the yields of fusible polymer appears to be dependent to a great extent upon the concentration of the monomer in the solution undergoing polymerisation. Thus, when very concentrated solutions containing a large quantity, for example, in excess of 40-50 percent of the monomeric allyl or methallyl methacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 95 percent of the theoretical may be secured. Accordingly, it is preferred to deal with solutions having a monomer concentration below 40 percent by weight.

The yield of fusible polymer appears to be increased by treating the solutions at increased temperatures and increased catalyst concentrations. Thus, substantially greater yields may be secured by polymerizing allyl methacrylate solutions at 100° C. or above, than may be secured at 60° C. Catalyst concentrations up to 5 percent or more may be used in some cases. In general, conditions favoring the formation of lower molecular weight polymers appear to result in increased yields of fusible products.

In many cases, the fusible polymer may be obtained by conducting the polymerization in the substantial absence of solvents. This is particularly true in the production of fusible polymers from those materials which polymerize slowly, for example, the unsaturated crotonic acid esters, such as allyl or methallyl crotonate or the corresponding phthalates, maleates, oxalates, itaconates, etc. In some cases it is found desirable to partially polymerize the polymer in the absence of solvents and subsequently to recover the fusible polymer by dissolving the product in a suitable solvent such as acetone and precipitating the fusible material with a nonsolvent, such as water or methyl alcohol. In many cases, however, the residual monomer may be removed by distillation at low temperatures in a vacuum. This process is particularly effective in dealing with materials which polymerize to form viscous products which retain a substantial quantity of unpolymerized monomer.

By operation in accordance with this modification, the base is coated with a composition containing both monomer and polymer as polymerizable constituents. In such a case, however, it is generally desirable that the intermediate fusible polymer be present in an amount in excess of that which can be obtained under normal circumstances by partially polymerizing undissolved or undiluted monomer. In the case of those materials which are active and polymerize rapidly, such as allyl methacrylate, the yield of fusible polymer which is obtained by direct polymerization of undiluted monomer is so low as to be ineffective for most purposes. While a somewhat higher yield of fusible polymer may be obtained from less actively polymerizing substances by direct polymerization of the monomer, it is found that the polymer produced contains too much monomer and that soft products are produced in the final polymerization, unless some monomer is removed. Generally speaking, the fusible polymer should comprise a major portion of the polymerizable constituents but for active esters such as allyl, methallyl, ethyl allyl, or chlorallyl acrylate, methacrylate, or chloracrylate, or the corresponding polyhydric alcohol polyesters, the fusible polymer content should be above 10 percent by weight of the polymerizable constituents. For less active products, such as diallyl phthalate, or diallyl maleate, the fusible polymer content is usually above 35 percent and preferably is 50 percent or more of the polymerizable constituents in the coating composition.

In coating thermoplastic bases, such as polymers derived from methyl methacrylate with the fusible convertible polymer, the polymer is generally applied as a solution which is allowed to evaporate to form a film. The fusible polymers of the type herein described are soluble in the sovents which are generally used for other fusible vinyl polymers, such as acetone, carbon tetrachloride, trichloro ethylene, tetrachloroethylene, xylene, toluene, benzene, dioxane, chloroform, triacetin, ethylene glycol monophenol ether has been substituted therefor, etc. After the film has dried, the product may be subjected to polymerization conditions in order to convert the surface film to the infusible state. Pressure is applied to the film in order to promote adhesion and impart smoothness to the surface. This may be done, for example, by pressing the coated product between smooth plates, for example, smooth glass plates during curing of the coated sheet. This process is generally termed "press polishing" and the surfaces thereby produced are known as "press polished" surfaces.

In order to insure the production of a transparent sheet which is free from surface defects and which possesses a coating having optimum adhesion, it is preferred that the infusible polymer be present as a very thin film. Preferably, this film should be of such thinness that a pressure which is just sufficient to cause the base plastic to yield will also cause the film to yield in a corresponding manner without fracture or impairment of the film. In applying films, such as allyl methacrylate, etc., to polymethyl methacrylate, it is found that optimum results may be secured by application of not substantially in excess of 20 grams of the coating material per square foot of methacrylate surface to be coated. The films thus produced are below about 0.01 inch in thickness, being in general, about 0.0003 inch thick in most cases. Where the allyl methacrylate or similar agent is used as the coating, the films preferably are less than 0.002 inch in thickness. It is to be understood, however, that the critical thickness for maximum hardness and adhesion varies with the composition of the plastic base, plasticizers used therein, flexibility thereof, etc., and that products having substantially greater thickness may be produced, if desired.

By use of a film of such thinness it is possible to obtain a product of unusual scratch resistance. To a large degree this is due to the higher flexibility of thin films and to the fact that the flexible thin films when in close adherence to the base plastic possess great resiliency and elasticity and resist penetration. The polymers derived from allyl methacrylate and similar materials are not only harder than polymers of methyl methacrylate but also are somewhat more rigid and brittle. Thus, where the film is relatively thick, a stress applied at some point on the surface thereof is not transmitted to the plastic below the film at any single point. In consequence, when a weighted point is drawn across such a thick film, the film itself takes up most of the weight of the point and the scratch resistance of the surface thereof is merely the scratch resistance of the film.

In contrast, when a weighted point is drawn across the surface of a coated plastic having a thin film of the surfacing polymer, both the base polymer and the surface polymer cooperate in resisting deformation under the point, some of the stress being transmitted to each. Since the film is thin, it is sufficiently flexible to conform to small deformation of the base without fracture and since it resists penetration, scratching by the weighted point is thereby avoided.

Stress applied to a localized portion of such a coated sheet may result in a transient yielding of the surface thereof; but upon release of the applied stress, the base by reason of its elasticity returns to its original form and since the film remains unfractured and unpenetrated, the coated product remains unscratched and undeformed. In general, the thin films used in accordance with this invention are not fractured until the base is deformed to a visible, substantially permanent degree. In many cases, the coated sheets have been bent to an angle of 10 or more degrees without apparent fracture or impairment of the film.

In some cases, difficulty may be encountered in securing a coating which is sufficiently adherent and free from fractures or other surface defects for commercial use. Difficulties of this nature are often encountered in applying unsaturated acrylates, such as allyl methacrylate to cellulose thermoplastics, such as cellulose acetate. In such a case, it may be desirable to provide the thermoplastic with an intermediate coating of a more mutually compatible composition, such as a coating of cellulose nitrate.

Figure 2:
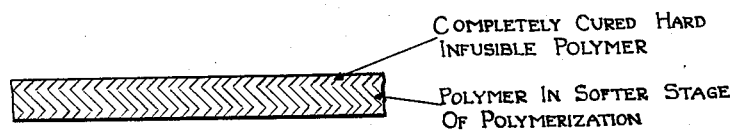
Fig. 2 is a similar view of a modified barrier.

In accordance with another phase of our invention, as illustrated in Fig. 2, a plastic product having the desired surface may be secured by polymerization from a single polymer which varies in degree of polymerization from the interior to exterior thereof. For example, allyl crotonate may be partially polymerized to form a sheet of the partially polymerized thermoplastic polymer of substantial thickness and flexibility. This sheet may then be subjected to further polymerization in order to convert the surface to the infusible state without converting the entire interior of the plastic to the completely polymerized state. This may be done, for example, by subjecting the sheet to the action of light or to surface heating while avoiding the use of such intense heat that the interior is converted or by incorporating inhibitors in the interior portion of the sheet or by incorporating a greater catalyst concentration adjacent the sheet surfaces. A product of similar structure may be produced by utilizing different concentrations of plasticizers in the interior and exterior portions of the sheet. This process may be applied to numerous other polymers such as polymers derived from allyl ethyl maleate, diallyl phthalate, etc.

The products produced in accordance with this invention are unusually hard and possess the transparency of the plastic base. The resistance to abrasion and scratch of these materials approximates the abrasion and scratch resistance of glass.

Certain tests indicate a resistance to scratch which is even superior to glass. Thus, in accordance with one test a rounded diamond point, normally used in a glass cutting pencil, was mounted to move freely in a vertical direction upon a rocker arm and used to compare the scratch resistance of the present product with that of uncoated resins and of glass. In accordance with this test, progressively increasing weights were placed upon the diamond point, the point placed upon a sheet of the product to be tested and the sheet moved in a straight line to permit the point to form a scratch upon the sheet.

The following table illustrates the loads required to produce a scratch upon the products tested:

|  | Load to form first indication of scratch | Load for clearly visible scratch |
|---|---|---|
|  | Grams | Grams |
| Methyl methacrylate polymer | 3-5 | 10 |
| Window glass | 4-10 | 30-50 |
| Methyl methacrylate polymer coated with 8 milligrams of allyl methacrylate polymer per sq. in. of base polymer | 30 | 50 |
| Methyl methacrylate polymer coated with 16 milligrams of allyl methacrylate per sq. in. of base polymer | 60 | 100-200 |
| Methyl methacrylate polymer coated with 20 milligrams polymerized glycol dimethacrylate per sq. in. of base polymer | 100 | 150-200 |

It will be evident that the above results are merely comparative and vary considerably in accordance with the sharpness of the diamond point. Obviously, a finely ground diamond point scratches all materials because of its extreme hardness. However, the above tests clearly demonstrate the superiority of applicant's barrier over other resinous products.

In many cases precautions must be taken in order to produce a surface which exhibits high resistance to scratch. Thus, it is found that upon application of a xylene solution of the fusible polymer to the surface of methyl methacrylate polymer and polymerization of the polymer without application of pressure between plates, the film thus obtained often has no appreciably improved resistance to scratch. Upon further curing of the coated material, in contact with a solid surface or a liquid surface such as vegetable or mineral oil, mercury, wax, etc., at a suitable temperature, for example, 100-175° C. with pressure, the film is converted to the normal scratch resistant state. The exact cause of this phenomenon is not known at present but is believed to be due to the presence of a small quantity of residual solvent or incompletely polymerized material which tends to soften the film. This belief appears to be warranted by the fact that when films are cured between plates with more or less pressure, a small residue or exudation remains upon the surface of the plates. Evidence of the fact that the solvent may have some effect may be derived from the fact that the soluble fusible polymer may mold onto the base and cure at atmospheric pressure with or without contact with a solid or liquid surface to produce films having the expected hardness.

When scratched products are examined under the microscope there is observed a marked difference in the type of scratch of a film which has been freed of solvent or otherwise treated to form a surface film having scratch resistance substantially greater than that of the base and films wherein the scratch resistance has not been developed. Thus, when a completely cured film, having high scratch resistance is subjected to the scratch test referred to above under a weight which is just sufficient to scratch the film, the scratch produced, when examined under a microscope of 30 magnification, consists of a line characterized by the presence of a series of closely spaced, substantially parallel lines intersecting the path of the point and indicating a plurality of cross fractures of the film. Since this type scratch apparently is due to the highly elastic character of the surface we have designated this characteristic type of scratch as "elastic scratch."

In contrast, incompletely hardened surfaces such as may be prepared by application of a solution of monomer and curing at low temperature when similarly tested form scratches which are entirely different. These scratches consist merely of a line delineating the path of the point without the cross fractures observed in the elastic scratch. Such a scratch indicates deformation as distinguished from cross fracture of the film and for purposes of convenience may be termed a plastic scratch. Bases coated with films exhibiting this plastic scratch possess a scratch resistance only slightly higher than that of the base itself while bases coated with films exhibiting the cross fractured type of scratch are substantially more scratch resistant than the base.

The following examples are illustrative:

*Example I.*—A mixture of 75 parts by weight of benzoyl peroxide, 225 parts by weight of monomeric allyl methacrylate and 1275 parts by weight of acetone was refluxed at 63° C. for three hours. 2800 parts by weight of methyl alcohol was then added to the mixture. The resulting mixture was then poured, with stirring, into 1000 parts by weight of a methyl-alcohol-water mixture containing 80 percent of methyl alcohol by volume. The precipitate thus formed was coagulated and recovered from solution.

A sheet of commercial molded "Lucite" which is a commercially available polymer of methyl methacrylate was pressed between smooth plates in order to render the surface more homogeneous and smooth. A xylene solution containing 5.5 grams of polymer per 100 cc. of solution was poured and spread evenly over the surface of the pressed plastic. 14.4 cc. of solution was applied per square foot of surface and the coated product was air-dried for 35 minutes. The "Lucite" sheet was then coated on the opposite side in the same manner and was then pressed between glass plates at a pressure of 1000 lbs. per sq. in. and at a temperature of 150° C. for 40 minutes. The coated sheet thus produced was colorless, transparent and free from surface defects. In order to compare its scratch resistance with glass, a diamond point pencil weighted with varying weights was applied to sheets of glass and the coated "Lucite" prepared in accordance with this sample. It was observed that heavier weights were required to produce visible scratches on the coated "Lucite" than were required to produce such scratches on glass. The abrasion-resistance of the coated product to falling 40-60 mesh silica sand, using the apparatus described in "Physical and Chemical Examination of Paints, Varnishes, Lacquers and Color" by Gardner, 6th edition, pages 222-223, was found comparable to that of glass rather than to that of uncoated "Lucite." Sheets of this material were used as the windshield and windows of an automobile and after several months' use were not objectionably scratched.

*Example II.*—55 parts by weight of allyl chloroacrylate was heated with 3 parts by weight of benzoyl peroxide and 350 parts by weight of acetone at a temperature of 60° C. for 4 hours. At this time, 300 parts of methanol were added to produce turbidity, and the resulting mixture was poured slowly, with stirring, into 1600 parts of methanol. The white voluminous precipitate thus formed was filtered and dried. It was soluble in acetone and chloroform, was softened at 110-125° C., became a highly plastic gum at 140-150° C. and was hardened upon further heating.

A sheet of polymerized methyl methacrylate was coated with a xylene solution containing 5.5 grams of this polymer and 0.5 gram of benzoyl peroxide per 100 cc. of solution as described in Example I, and the coated product was heated between glass plates to 140° C. at a pressure of 875 pounds per square inch for six minutes. The product obtained was clear and free from surface defects and its resistance to scratch was comparable to that of the product produced in accordance with Example I.

Example III.—45 grams (0.5 mole) of anhydrous oxalic acid, 116 grams (2.0 moles) of allyl alcohol, and 3.2 grams of p-toluenesulfonic acid were heated together at 130–140° C. for 22 hours. The water and excess alcohol were then removed by slow distillation. The diallyl oxalate was then distilled at a temperature of 106–107° C. under a pressure of 6 mm. of mercury.

A sample of diallyl oxalate containing 5 percent by weight of benzoyl peroxide was heated in a closed tube at 150° C. for 35 hours at which time the viscous solution was poured into methyl alcohol to recover the fusible polymer. A solution containing 5.5 grams of the fusible polymer and 0.5 gram of benzoyl peroxide per 100 cc. of solution was applied to the surface of a sheet at 150° C. under a pressure of 1200 pounds per square inch for 10 hours. The cured sheet possessed a hard, solvent-resistant surface.

Example IV.—A quantity of monomeric ethylene glycol dicrotonate was heated with 5 percent by weight of benzoyl peroxide at 150° C. until the solution became viscous. The solution was then cooled to room temperature and introduced into an equal portion of acetone and the fusible polymer was precipitated with methyl alcohol as in Example I. A coating of a 5 percent solution of this polymer containing 0.5 percent benzoyl peroxide was applied to the surface of a polymer of methyl methacrylate copolymerized with sufficient allyl crotonate to render the product insoluble. After this coating was dried the coated polymer was placed in a mold and heated to a temperature of 150° C. for 2 hours, at a pressure of 1000 pounds per square inch. The article possessed a hard, solvent-resistant surface.

Example V.—Glycol dimethacrylate containing 1 percent benzoyl peroxide and 0.1 percent hydroquinone heated at 74° C. until the viscosity of the liquid was approximately doubled. The liquid was then treated with methyl alcohol as described in Example I, and a 5 percent yield of a white acetone soluble precipitate was formed.

A xylene solution containing 10 grams of this precipitate per 100 cc. of solution was applied to the surface of a sheet of a methyl methacrylate polymer as described in Example I, and a product having a hard, wear-resistant surface was thereby secured.

Example VI.—A quantity of monomeric allyl crotonate was heated in a stream of air at a temperature of 150–160° C. until the liquid began to get viscous. The liquid was then dissolved in acetone and the fusible polymer was precipitated with methyl alcohol in the manner described in Example I. The precipitated polymer was recovered as a white, gummy mass which dried to form a white, acetone soluble powder. A 5 percent solution of this powder containing 0.5 gram of benzoyl peroxide in xylene was applied to a sheet of polymeric methyl acrylate and cured in a mold at a pressure of 1000 pounds per square inch at a temperature of 140° C. for 2 hours. The resulting product possessed a hardened, solvent-resistant surface.

Example VII.—A sheet of cellulose acetate was coated with a film of nitrocellulose and then coated with fusible allyl methacrylate in the manner described in Example I, and a sheet having a hard, solvent-resistant surface was thereby secured.

Example VIII.—A quantity of diallyl phthalate was prepared by heating a mixture of allyl alcohol and phthalic anhydride, which contained allyl alcohol in an amount slightly in excess of the theoretical amount required for diallyl phthalate, to a temperature of 90–95° C. in the presence of 2 percent paratoluenesulphonic acid for 15 hours. The mixture was washed with 0.1 N sodium hydroxide solution to remove acid and unreacted material and the diallyl phthalate was recovered by distillation at a pressure of 6 millimeters and a temperature of 170° C.

One part by weight of diallyl phthalate was heated at 150° C. for two and one-half hours and was then dissolved in two parts by weight of acetone. Methyl alcohol was added to the solution in an amount required to completely precipitate the polymer. This polymer was then redissolved to form a 10 percent solution of acetone which contained 1 percent benzoyl peroxide and a sheet of polymerized methyl methacrylate was dipped into the solution. The dipped sheet was then heated at a temperature of 150° C. under a pressure of 1000 pounds per square inch for 4 hours. The resulting product possessed a hardened, solvent-resisting surface.

Example IX.—A quantity of ethyl allyl maleate was heated with one percent benzoyl peroxide at 130° C. for 15 minutes, when the process began to grow viscous heating was then discontinued and sufficient methyl alcohol was added to completely precipitate the polymer. The polymer was then redissolved in acetone to form a 5 percent solution thereof which contained 0.5 percent of benzoyl peroxide. This solution was applied to a sheet of polymeric methyl methacrylate and the sheet was heated in a mold at 150° C. under a pressure of 1200 pounds per square inch for 6 hours, whereby a product having a hardened, solvent-resistant surface was secured.

Example X.—15 cc. of the xylene solution of the allyl methacrylate polymer described in Example I was applied to each square foot of surface of a sheet formed by the cast polymerization of a mixture of 80 parts of vinyl acetate and 20 parts of diallyl succinate and 5 parts of benzoyl peroxide, and curing at 120° C. The product was dried and cured under pressure of 1000 pounds per square inch for one hour.

Example XI.—A xylene solution of glycol dimethacrylate prepared as described in Example V was applied as in Example I, to the surface of a copolymer formed by copolymerizing 50 parts of diallyl maleate and 50 parts of methylmethacrylate and the coated product was dried and cured as described as in Example I.

Although the present invention has been described and claimed with reference to the specific details of certain embodiments thereof, it is not intended that such details shall be regarded as limitations upon the scope of the invention except insofar as included in the accompanying claims. This application is a continuation-in-part of our copending application Serial No. 257,135, filed Feb. 18, 1939.

We claim:

1. An artificial glass which comprises a transparent fusible plastic which is derived from the polymerization of a saturated ester of an acid of the group consisting of acrylic and alpha-substituted acrylic acids which is surfaced with a film of hard, wear-resistant, transparent, substantially insoluble, infusible polymer derived by the polymerization of an organic compound having two unsaturated polymerizable groups separated by oxygen linkages, said film being of a thickness not substantially greater than 0.002 inch.

2. An artificial glass which comprises polymeric methyl methacrylate surfaced with a film of transparent polymeric allyl methacrylate having a thickness not substantially in excess of 0.002 inch.

3. An artificial glass which comprises a transparent thermoplastic base which is surfaced with a substantially infusible polymer of an unsaturated alcohol ester of an alpha substituted acrylic acid, the surface thereof being characterized by the fact that a point weighted to make a permanent mark and moved across the surface produces an elastic scratch.

4. An artificial glass which comprises a transparent substantially rigid thermoplastic resin sheet which is surfaced with a film of a substantially infusible and insoluble polymer of an organic compound having at least two polymerizable unsaturated groups separated by oxygen linkages, said film being of a thickness not substantially greater than 0.002 inch.

5. An artificial glass which comprises a transparent substantially rigid thermoplastic resin sheet which is surfaced with a film of a substantially infusible insoluble polymer of an organic compound having at least two polymerizable unsaturated groups separated by oxygen linkages, the surface thereof being characterized by the fact that a point weighted to make a permanent mark and moved across the surface produces an elastic scratch.

IRVING E. MUSKAT.
MAXWELL A. POLLACK.
FRANKLIN STRAIN.
WILLIAM A. FRANTA.